United States Patent
Achour

(10) Patent No.: US 11,265,073 B2
(45) Date of Patent: Mar. 1, 2022

(54) METHOD AND APPARATUS FOR A METASTRUCTURE REFLECTOR IN A WIRELESS COMMUNICATION SYSTEM

(71) Applicant: Metawave Corporation, Palo Alto, CA (US)

(72) Inventor: Maha Achour, Palo Alto, CA (US)

(*) Notice: Subject to any disclaimer, the term of this patent is extended or adjusted under 35 U.S.C. 154(b) by 0 days.

(21) Appl. No.: 16/203,553

(22) Filed: Nov. 28, 2018

(65) Prior Publication Data

US 2019/0165850 A1 May 30, 2019

Related U.S. Application Data

(60) Provisional application No. 62/591,396, filed on Nov. 28, 2017.

(51) Int. Cl.
| | | |
|---|---|---|
| *H04B 7/145* | (2006.01) | |
| *H04B 1/40* | (2015.01) | |
| *H01Q 15/00* | (2006.01) | |
| *H01Q 3/44* | (2006.01) | |

(52) U.S. Cl.
CPC ............... *H04B 7/145* (2013.01); *H01Q 3/44* (2013.01); *H01Q 15/002* (2013.01); *H01Q 15/0086* (2013.01); *H04B 1/40* (2013.01)

(58) Field of Classification Search
CPC . H04B 7/145; H04B 1/40; H01Q 3/44; H01Q 15/002; H01Q 15/0086
USPC .......................................................... 375/262
See application file for complete search history.

(56) References Cited

U.S. PATENT DOCUMENTS

| | | | |
|---|---|---|---|
| 7,250,908 B2 | 7/2007 | Lee | |
| 7,847,739 B2 | 12/2010 | Achour et al. | |
| 8,633,866 B2 | 1/2014 | Sarabandi et al. | |
| 9,545,923 B2 | 1/2017 | Casse et al. | |
| 2004/0201537 A1* | 10/2004 | Stolle | H01Q 19/10 343/797 |
| 2005/0206573 A1* | 9/2005 | Iigusa | H01Q 15/02 343/770 |
| 2011/0175789 A1 | 7/2011 | Lee et al. | |
| 2011/0194551 A1 | 8/2011 | Lee et al. | |
| 2012/0003925 A1* | 1/2012 | Coldrey | H04W 88/04 455/7 |
| 2012/0039242 A1* | 2/2012 | Alexiou | H04L 47/6255 370/315 |

(Continued)

OTHER PUBLICATIONS

F. Yang, et al., "Novel Phased Array Designs Using Reconfigurable Refection and Transmission Surfaces," in IEEE International Symposium on Antennas and Propagation and USNC-URSI Radio Science Meeting, Boston, MA, Jul. 2018, pp. 2973.

(Continued)

*Primary Examiner* — Wednel Cadeau
(74) *Attorney, Agent, or Firm* — Sandra Lynn Godsey

(57) ABSTRACT

Examples disclosed herein relate to a metastructure reflector in a wireless communication system. The metastructure reflector has a transceiver unit adapted to receive transmissions from a base station, a radiating structure having a plurality of subarrays of radiating cells to radiate the transmissions to at least one user equipment, the at least one user equipment in a non-line-of-sight area of the base station, and a subarray controller to control a plurality of subarrays of the radiating structure to radiate the transmissions in multiple directions.

20 Claims, 9 Drawing Sheets

(56) References Cited

U.S. PATENT DOCUMENTS

| | | |
|---|---|---|
| 2015/0022407 A1 | 1/2015 | Piazza et al. |
| 2015/0022421 A1* | 1/2015 | Vigano .............. H01Q 21/0006 343/853 |
| 2015/0229028 A1 | 8/2015 | Bily et al. |
| 2016/0011307 A1 | 1/2016 | Casse et al. |
| 2016/0013531 A1 | 1/2016 | Casse et al. |
| 2016/0087349 A1* | 3/2016 | Lee .................. H01Q 1/246 342/373 |
| 2016/0345189 A1* | 11/2016 | Miyagawa ......... H04B 7/18517 |
| 2018/0152235 A1* | 5/2018 | Smoot ............... H04B 7/18515 |
| 2019/0074325 A1* | 3/2019 | Hettak ................ H01L 27/105 |

OTHER PUBLICATIONS

C. Balanis, et al.,"Smart Antennas," in Introduction to Smart Antennas, 1st ed., San Rafael, CA, USA: Morgan & Claypool Publishers, ch. 4, pp. 33-67, 2007.

C. G. M. Ryan, et al. "A Wideband Transmitarray Using Dual-Resonant Double Square Rings," in IEEE Transactions an Antennas and Propagation, vol. 58, No. 5, pp. 1486-1493, May 2010.

V.C. Sanchez, et al. ,"Artificial Magnetic Conductors/High-Impedance Surfaces," in Frontiers in Antennas: Next Generation Design & Engineering by Frank B. Gross, The McGraw-Hill Companies, Inc., ch. 4, pp. 169-201, 2011.

I. Montesinos, et al. "Geoda: Conformal Adaptive Antenna of Multiple Plannar Arrays for Satellite Communications," 2008 IEEE Antennas and Propagation Society International Symposium, San Diego, CA, pp. 1-4, Aug. 2008.

C.A. Allen, et al. "Leaky-Waves in a Metamaterial-Based Two-Dimensional Structure for a Conical Beam Antenna Application," 2004 IEEE MTT-S International Microwave Symposium Digest (IEEE Cat. No. 04CH37535), Fort Worth, TX, USA, vol. 1, pp. 305-308, Jun. 2004.

J.Y. Lau, "Reconfigurable Transmitarray Antennas," Ph.D. dissertation, Dept. of Electrical and Computer Engineering, University of Toronto, Toronto, Canada, 2012.

S. Lim, et al. "Metamaterial-Based Electronically Controlled Transmission-Line Structure as a Novel Leaky-Wave Antenna with Tunable Radiation Angle and Beamwidth," in IEEE Transactions on Microwave Theory and Techniques, vol. 53, No. 1, pp. 161-173, Jan. 2005.

L. Boccia, et al. "Multilayer Antenna-Filter Antenna for Beam-Steering Transmit-Array Applications," in IEEE Transactions on Microwave Theory and Techniques, vol. 60, No. 7, pp. 2287-2300, Jul. 2012.

A. Ourir, et al., "Electromagnetically Induced Transparency in Symmetric Planar Metamaterial at THz Wavelengths," in Photonics, No. 2, pp. 308-316, Mar. 2015.

A. H. Abdelrahman, et al. "Transmission Phase Limit of Multilayer Frequency-Selective Surfaces for Transmitarray Designs," in IEEE Transactions on Antennas and Propagation, vol. 62, No. 2, pp. 690-697, Feb. 2014.

C. Tripon-Canseliet, et al. "Contribution of Metamaterials to Improvement of Scan Performance and Reconfigurability of Phased Array Antennas," 2014 International Radar Conference, Lille, France, pp. 1-3, Oct. 2014.

J. Reis, et al. "Two-Dimensional Transmitarray Beamsteering Using Stacked Tunable Metamaterials," Loughborough Antennas & Propagation Conference, Loughborough, UK, Nov. 2014, pp. 495-499.

\* cited by examiner

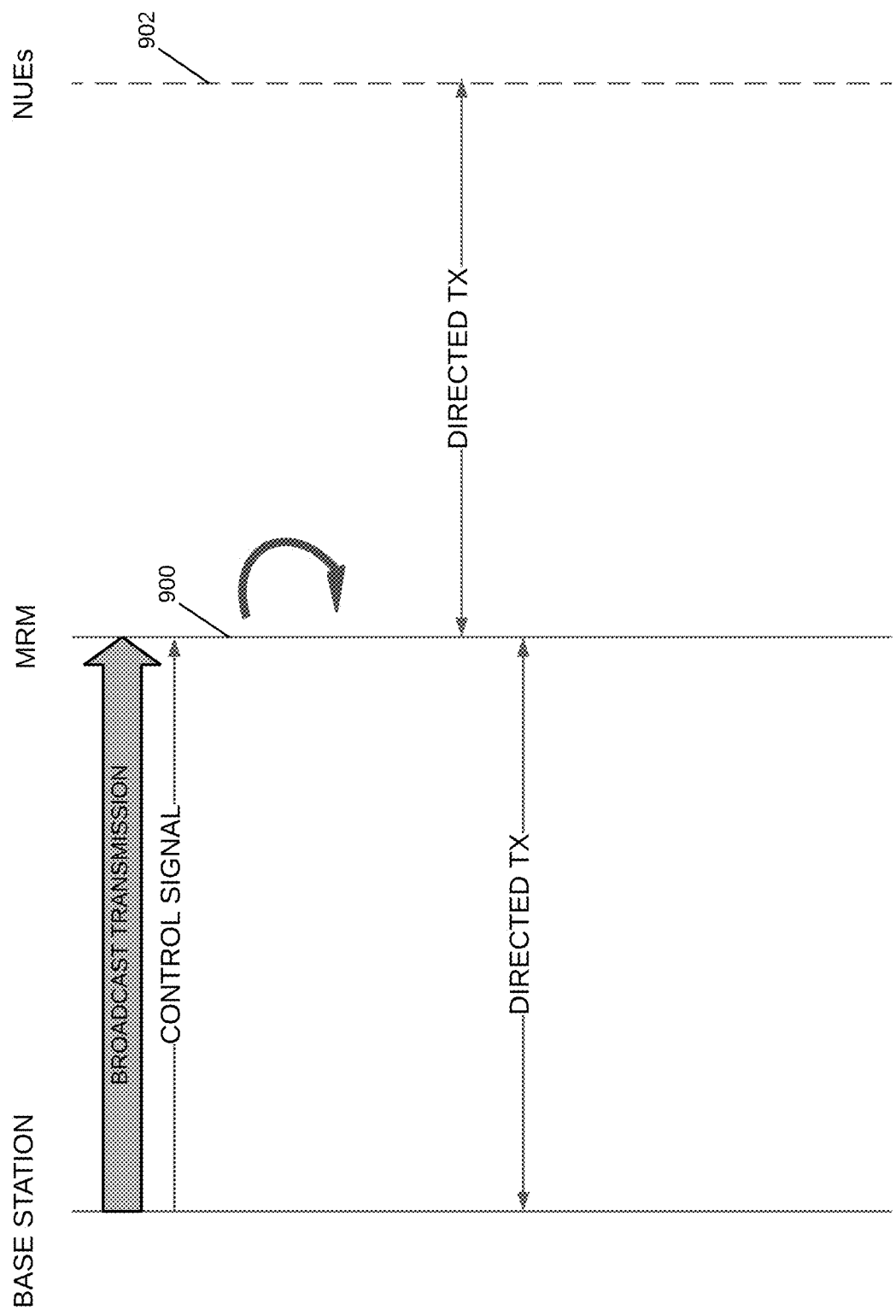

METHOD AND APPARATUS FOR A METASTRUCTURE REFLECTOR IN A WIRELESS COMMUNICATION SYSTEM

CROSS-REFERENCE TO RELATED APPLICATIONS

This application claims priority to U.S. Provisional Application No. 62/591,396, filed on Nov. 28, 2017, and incorporated herein by reference.

BACKGROUND

Many transmission systems, such as wireless systems, operate in an ever-expanding sphere of connectivity. Mobile data traffic demands continue to grow every year, challenging wireless systems to provide greater speed, connect more devices, have lower latency, and transmit more and more data at once. Users now expect instant wireless connectivity regardless of the environment and circumstances, whether it is in an office building, a public space, an open preserve, or a vehicle. The desire to communicate in environments having interference and obstacles often impedes a wireless signal. In these scenarios, a system goal is to optimize efficiency and focus energy directly to a user.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein:

FIG. 9 is a signal flow diagram of operation of an MRM, in accordance with various examples.

DETAILED DESCRIPTION

Methods and apparatuses for a metastructure reflector in a wireless communication system are disclosed. The metastructure reflector reflects a wireless signal to connect with mobile devices or User Equipment ("UE") that are in non-line-of-sight ("NLOS") positions. In various examples, the metastructure reflector is able to receive a broadcast signal from a transmitter, such as a base station ("BS") and generate directed transmissions to a NLOS UE. The ability to initiate a directed transmission with multiple devices provides a way for a wireless network operator to offer ubiquitous wireless coverage to its users.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
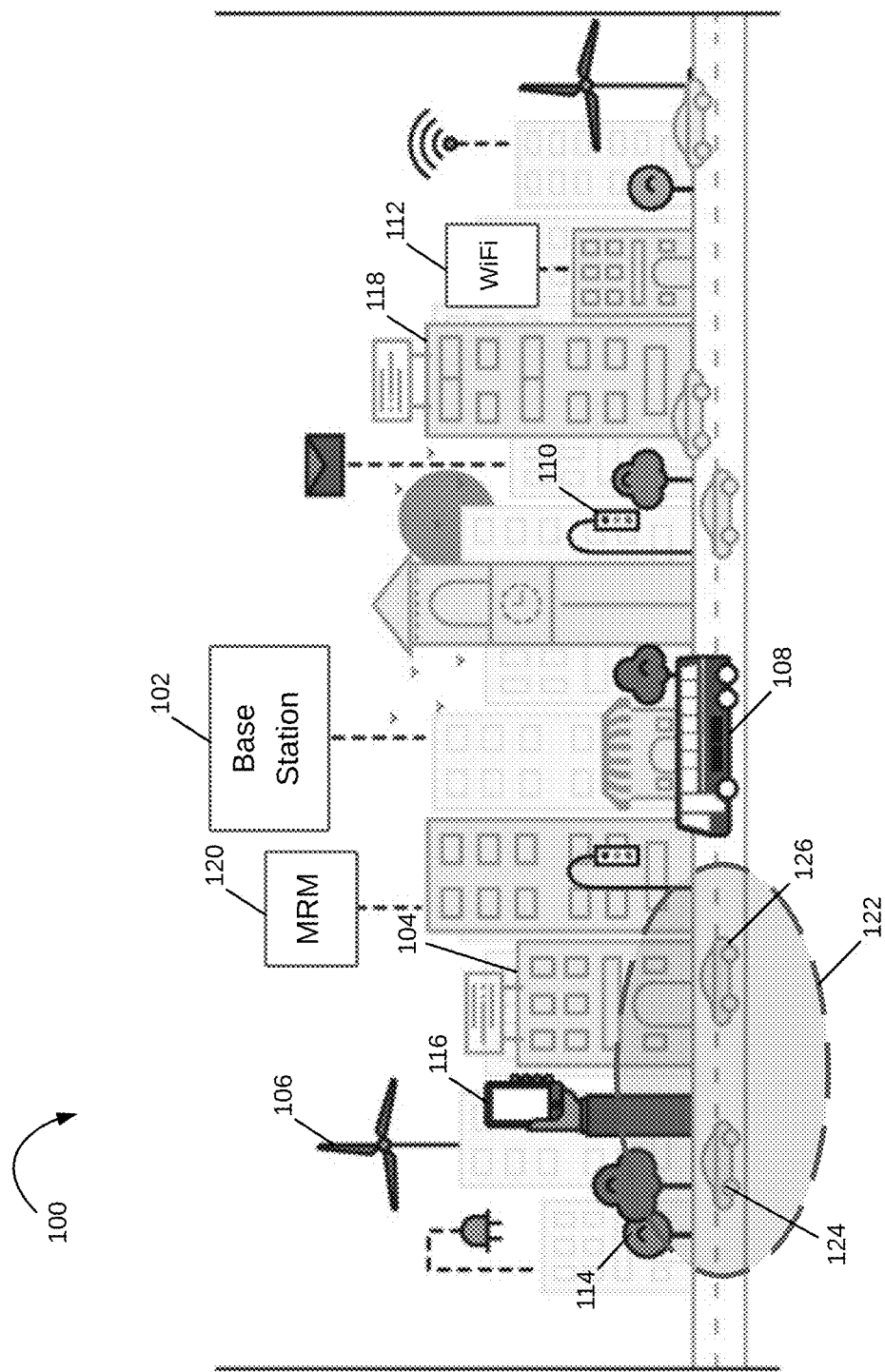
FIG. 1 is a schematic diagram of a wireless communication environment having a Metastructure Reflector Module ("MRM") in accordance with various examples.

FIG. 1 is a schematic diagram of a wireless communication environment having a Metastructure Reflector Module ("MRM") in accordance with various examples. Wireless communication environment 100 has a base station 102 for cellular transmissions throughout the environment 100. While described with respect to a cellular system for clarity of understanding, the examples are applicable in other wireless systems where obstacles and environmental features impede communications resulting in non-line-of-sight areas or dead zones.

As illustrated, environment 100 has a variety of obstacles. Base Station ("BS") 102 is positioned within an urban area with fixed structures, such as building 104, stationary moving objects, such as windmill 106, moving vehicles, such as bus 108, signals and controls, such as traffic signal 110, other wireless transmission points, such as WiFi transmission point 112, and other potential obstacles, such as trees 114. There are any number of contributors to interference in environment 100. For example, stationary obstacles such as building 104 result in a dead zone for BS 102, where a wireless device/UE 116 may have interrupted service within the coverage area of BS 102. Interrupted or insufficient wireless coverage may occur in environment 100 even when there are multiple BSs close together, as the cellular system configuration may predate the buildings and other obstacles.

In various examples, a transmission from BS 102 may be in progress to UE 116, or either device may be in the process of initiating a communication, such as a hand-off from another BS (not shown) or starting a new call. These transmissions are impeded by obstacles, including buildings and structures. Some of the obstacles include buildings 104 and 118, which create NLOS areas, which may be referred to as "dead zones." To achieve universal coverage, a Metastructure Reflector Module ("MRM") 120 is positioned proximate BS 102, but having access to the dead zone 122 of BS 102. The MRM 120 performs a reflector-type operation to provide coverage within dead zone 122. The reflector-type operation is similar to a repeater or other device to extend the wireless range/reach of a wireless transmitter.

In the present example, the MRM 120 is an active device, wherein its behavior is controlled to enable directed transmissions to individual users or groups of users. As described in more detail below, this is done through beam forming at the antenna of MRM 120, wherein the reactance of one or more transmission line paths within the MRM 120 is modified to change the beam shape, direction, size, and parameters. In operation, the MRM 120 receives transmissions from the BS 102 that are broadcast signals not necessarily directed to individual users such as UE 116. In response to the broadcast signals, MRM 120 determines the control to generate one or more directed beams to individual recipients. In this way, MRM 120 extends the reach of the BS 102. As illustrated, at this snapshot in time, UE 116 and vehicles 124-126 cannot receive the signals from BS 102 due to their position within the dead zone 122. MRM 120 receives the signals from BS 102 and generates communications to the UE 116 and vehicles 124-126, as well as any other wireless devices within the dead zone 122. Note that in a very congested area, there may be multiple MRMs to cover a dead zone or zones, such as in a high population city or a dense environment.

The environment 100 may include any of a variety of different transmission mechanisms, such as a Wi-Fi transmission unit 112, vehicle-to-vehicle communications, and so forth. These may be reflected by an MRM in some applications. Note that the dead zone 122 is shown as an oval shape for illustration purposes; however, this may take a variety of shapes depending on the environment and obstacle configurations. Similarly, dead zone 122 may be a combination of multiple distinct and separate areas, wherein the MRM 120 is configured to transmit signals within these multiple areas.

Note also that within environment 100 are large vehicles that may be obstacles and/or UE devices. The bus 108 is one such vehicle, and its movement may cause dead zones in its proximity. Such moving dead zones are difficult to anticipate, and therefore, MRM 120 may be configured and/or positioned along roadways considering the possible events that may occur, including traffic jams and so forth. Not all of these will cause full interruption of transmissions from BS 102, but the signals may be weak or distorted. MRM 120 enables the network to design BS 102 with less stringent requirements as MRM 120 (and other MRMs) extends the range of the BS 102.

Figure 2:
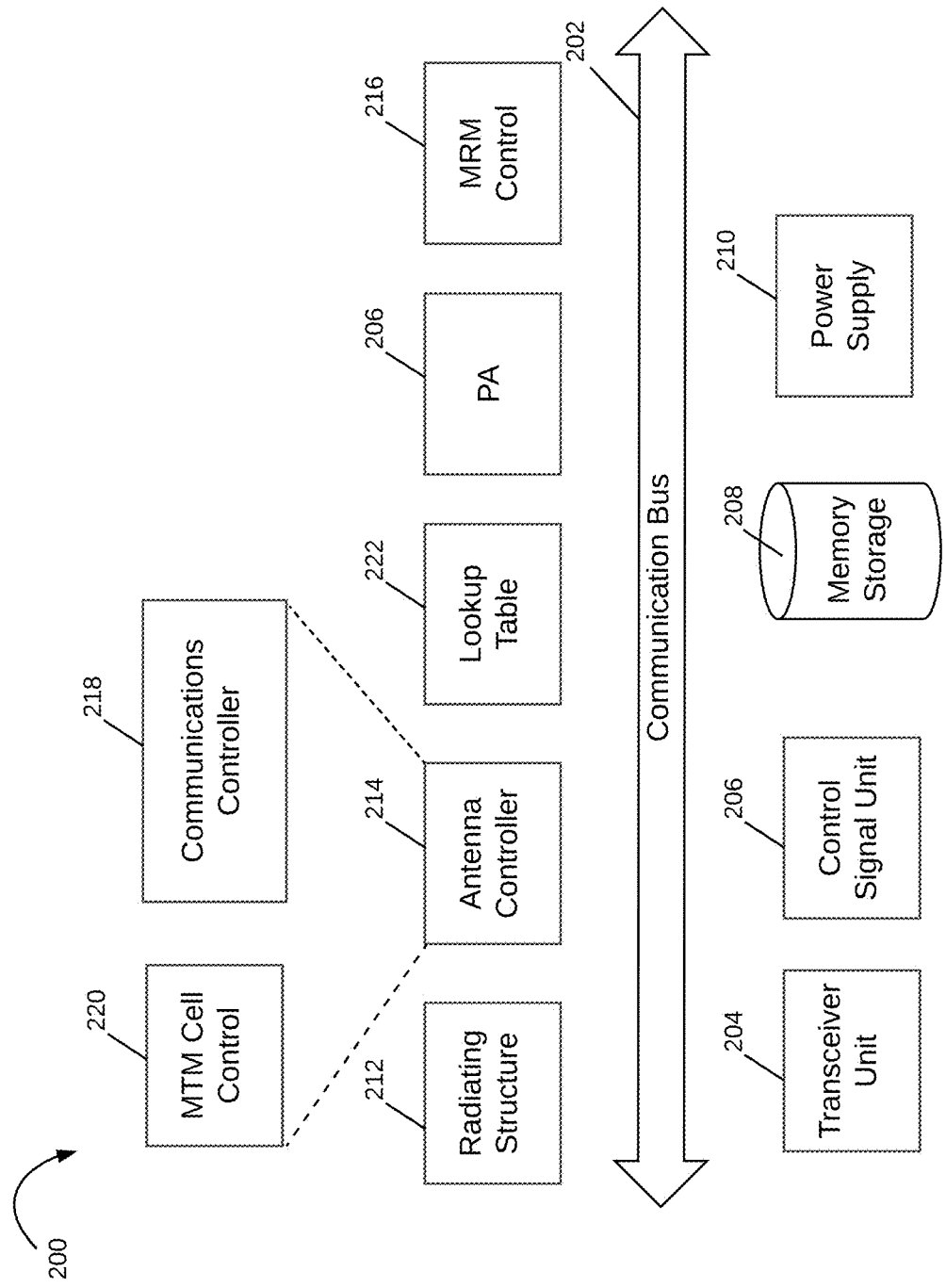
FIG. 2 is a schematic diagram of an MRM, as in FIG. 1, in accordance with various examples.

Attention is now directed to FIG. 2, which illustrates a schematic diagram of an MRM in accordance with various examples. MRM 200 has various modules that may be directly coupled, shared with other portions of a wireless system, or communicate through a communication mechanism, such as communication bus 202. Signals are received at a transceiver unit 204, which contains a control channel receiver unit, that responds to a control signal and uses this information to reflect signals and information to various users within the environment 100 of FIG. 1. MRM 200 includes control signal unit 206 for generating control signals to transceiver unit 204. MRM 200 further includes memory storage 208, power supply 210 and a radiating structure 212.

Radiating structure 212 is a metastructure configured for radiation of EM waves. A metastructure, as generally defined herein, is an engineered structure capable of controlling and manipulating EM radiation at a desired direction based on its geometry. In some examples, radiating structure 212 is a metamaterial ("MTM") device having a plurality of MTM unit cells, configurable to provide directed beam forms to UEs. Radiating structure 212 is controlled by antenna controller 214 and in response to MRM control 216. In some examples, MRM control 216 may include mechanical movement of the MRM 200 to achieve improved coverage. Radiating structure 212 is positioned to cover a wide area and supports beam formation of a variety of beam widths and in a variety of directions. As described in more detail below, this beamforming is done by affecting the reactance parameters of the MTM unit cells of the radiating structure 212.

Continuing with FIG. 2, the antenna controller 214 has a communications controller 218 and an MTM cell controller 220. The communications controller 218 determines the specifics of how to reflect a received signal according to the placement of MRM 200, which allows for extension of the transmission signals from the BS 102, which may be multicast or unicast broadcast transmissions. When a UE is in communication with the BS 102, the MRM 200 receives the signal from BS 102 and recognizes a need to reflect it directly to the UE. The communications controller 218 determines where the UE is located and continues the transmission by directed beamforming. Similarly, when a UE is in a dead zone and initiates a communication with the BS 102, the MRM 200 receives the initiation request, identifies the request as coming from a dead zone, and transmits the request to the BS 102. The MRM 200 in this way enables the BS 102 to effectively track a UE and keep communications continuing within its coverage area, even when blocked by interference or obstacles. A lookup table 222 may be used to assign different frequencies to different users, and allocate portions of the radiating structure as frequency-selective arrays, such as illustrated in FIG. 3.

Figure 3:
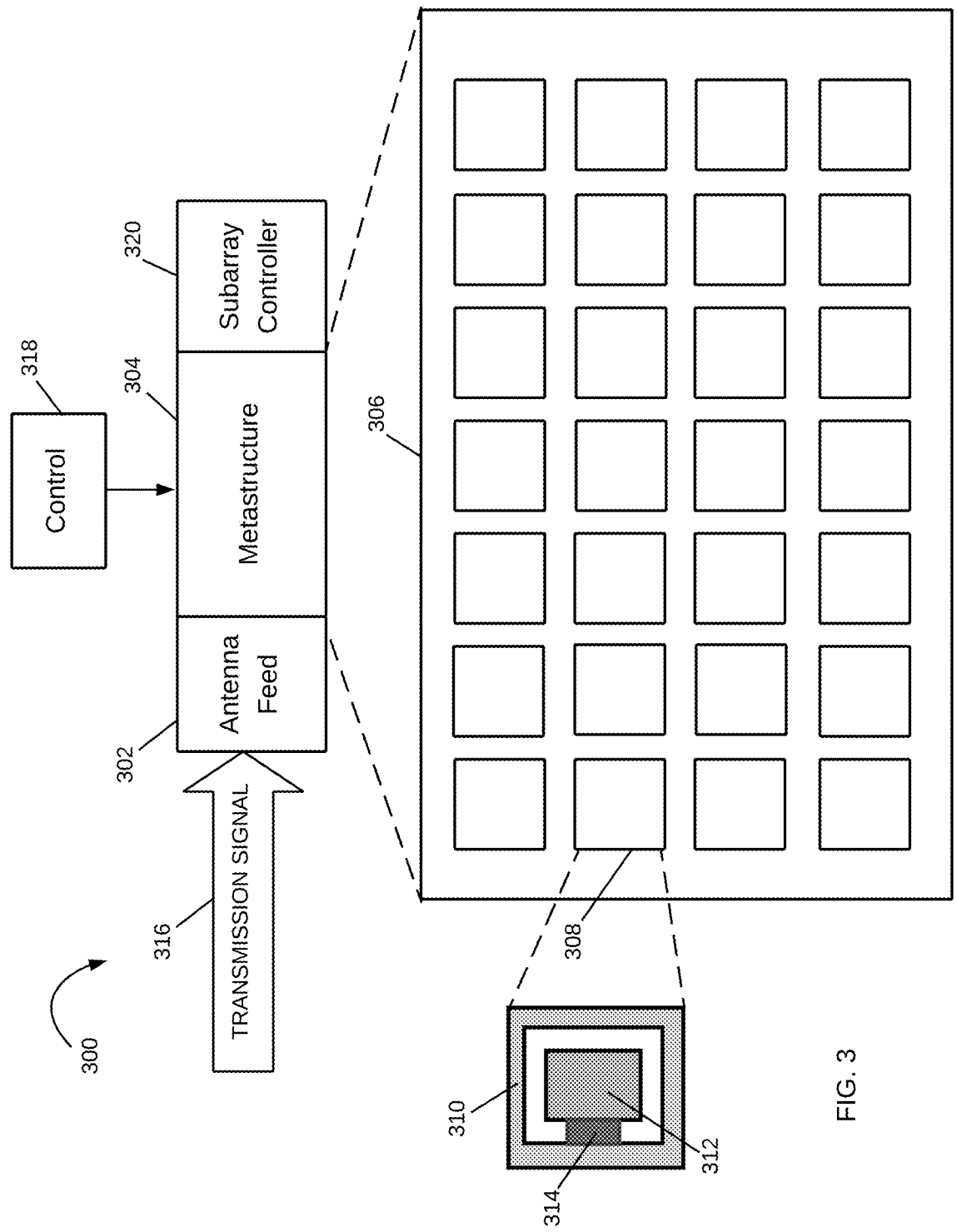
FIG. 3 is a schematic diagram of a radiating structure of an MRM, in accordance with various examples.

FIG. 3 shows a schematic diagram of an example radiating structure of an MRM. MRM 300 has an antenna feed 302 and a metastructure antenna 304. Metastructure antenna 304 has an array of radiating elements or cells 306. As illustrated, the cells 306 are uniform structures. Alternate examples may be configured to include different size and/or shape cells. In one example, each cell 306 is designed to operate in the right-handed mode positive index of refraction with phase engineering on the spatial domain to achieve the desired transmission characteristics. In another example, each cell 306 may be a metamaterial ("MTM") cell. An MTM cell is an artificially structured element used to control and manipulate physical phenomena, such as the electromagnetic properties of a signal including its amplitude, phase, and wavelength. Metamaterial cells behave as derived from inherent properties of their constituent materials, as well as from the geometrical arrangement of these materials with size and spacing that are much smaller relative to the scale of spatial variation of typical applications.

A metamaterial is a geometric design of a material, such as a conductor, wherein the shape creates a unique behavior for the device. An MTM cell may be composed of multiple microstrips, gaps, patches, vias, and so forth having a behavior that is the equivalent to a reactance element, such as a combination of series capacitors and shunt inductors. Various configurations, shapes, designs and dimensions are used to implement specific designs and meet specific constraints. In some examples, the number of dimensional degrees of freedom determines the characteristics of a cell, wherein a cell having a number of edges and discontinuities may model a specific-type of electrical circuit and behave in a given manner. In this way, an MTM cell radiates according to its configuration. Changes to the reactance parameters of the MTM cell result in changes to its radiation pattern. Where the radiation pattern is changed to achieve a phase change or phase shift, the resultant structure is a powerful antenna, as small changes to the MTM cell can result in large changes to the beamform. The array of cells 306 is configured so as to form a beamform or multiple beamforms involving subarrays of the cells or the entire array.

The MTM cells 306 may include a variety of conductive structures and patterns, such that a received transmission signal is radiated therefrom. In some examples, each MTM cell may have unique properties. These properties may include a negative permittivity and permeability resulting in a negative refractive index; these structures are commonly referred to as left-handed materials ("LHM"). The use of LHM enables behavior not achieved in classical structures and materials, including interesting effects that may be observed in the propagation of electromagnetic waves, or transmission signals. Metamaterials can be used for several interesting devices in microwave and terahertz engineering such as antennas, sensors, matching networks, and reflectors, such as in telecommunications, automotive and vehicular, robotic, biomedical, satellite and other applications. For antennas, metamaterials may be built at scales much smaller than the wavelengths of transmission signals radiated by the metamaterial. Metamaterial properties come from the engineered and designed structures rather than from the base material forming the structures. Precise shape, dimensions, geometry, size, orientation, arrangement and so forth result in the smart properties capable of manipulating electromagnetic waves by blocking, absorbing, enhancing, or bending waves.

In some examples, at least one of the MTM cells is coupled to a reactance control mechanism, such as a varactor to change the capacitance and/or other parameters of the MTM cell. By changing a parameter of the MTM cell, the resonant frequency is changed, and therefore, the array 306 may be configured and controlled to direct beams to UEs in dead zone areas. An example of such a cell is illustrated as MTM cell 308. MTM cell 308 has a conductive outer portion or loop 310 surrounding a conductive area 312 with a space in between. Each MTM cell 306 may be configured on a dielectric layer, with the conductive areas and loops provided around and between different MTM cells. A voltage controlled variable reactance device 314, e.g., a varactor, provides a controlled reactance between the conductive area 312 and the conductive loop 310. By altering the reactance of MTM cells 306, signals radiated from MRM 300 are formed into beams having a beam width and direction as determined by such control. The individual unit cells 306 may be arranged into sub arrays that enable multiple beamforms in multiple directions concurrently.

In one example, a transmission signal 316 is provided to the antenna feed 302, which has a plurality of transmission lines for distributing the signal 316 to the metastructure antenna 304. MTM cell control 318 controls cells 306 to generate directional beamforms to UEs in NLOS areas by controlling the reactance control mechanisms, e.g., varactor 314, in each cell 306. The controlled reactance is controlled by an applied voltage, such as an applied reverse bias voltage in the case of a varactor. The change in reactance changes the behavior of the MTM cell 308. The voltage control is performed by MTM cell control 318 in response to identification of a position of the UE with respect to the BS 102. The transceiver unit 204 of FIG. 2 provides this direction information and acts to instruct the MTM cell control 318 as to where to direct the beam.

Subarray controller 320 acts to control individual subarrays of metastructure 304. In one example, this is accomplished by providing bias voltages to the varactors in the cells of each subarray according to the desired directions for the directional beamforms. Each subarray may receive a different bias voltage, thereby enabling MRM 300 to provide multiple directional beamforms to enhance wireless coverage to users in NLOS areas or dead zones.

Figure 4:
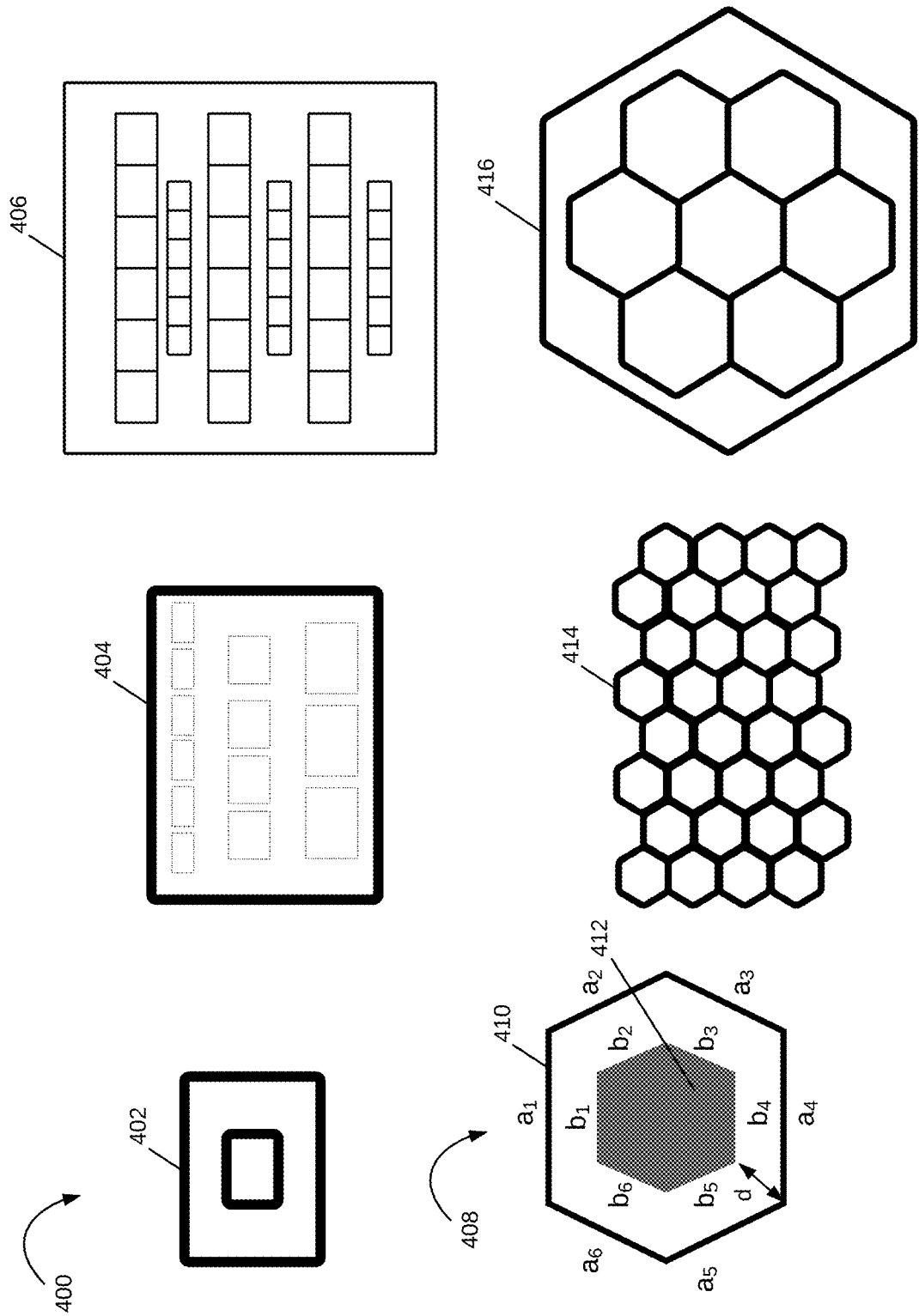
FIGS. 4-5 illustrate radiating element configurations in accordance with various examples.
Figure 5:
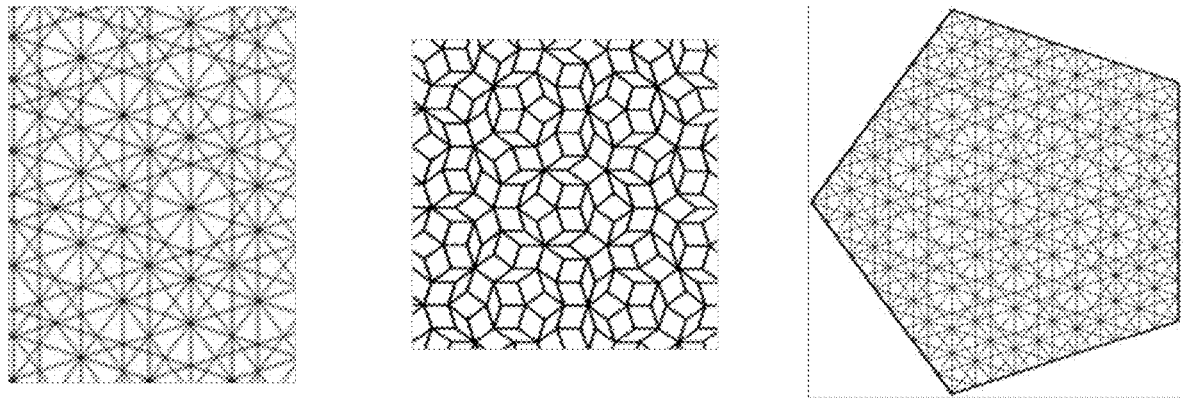
Figure 5:
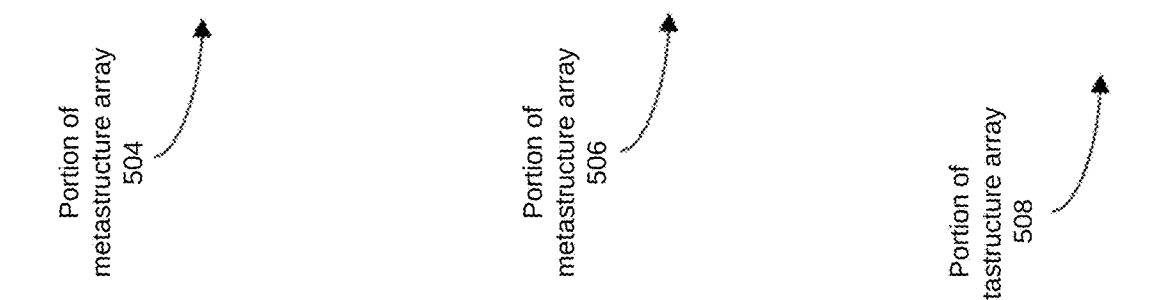
Figure 5:
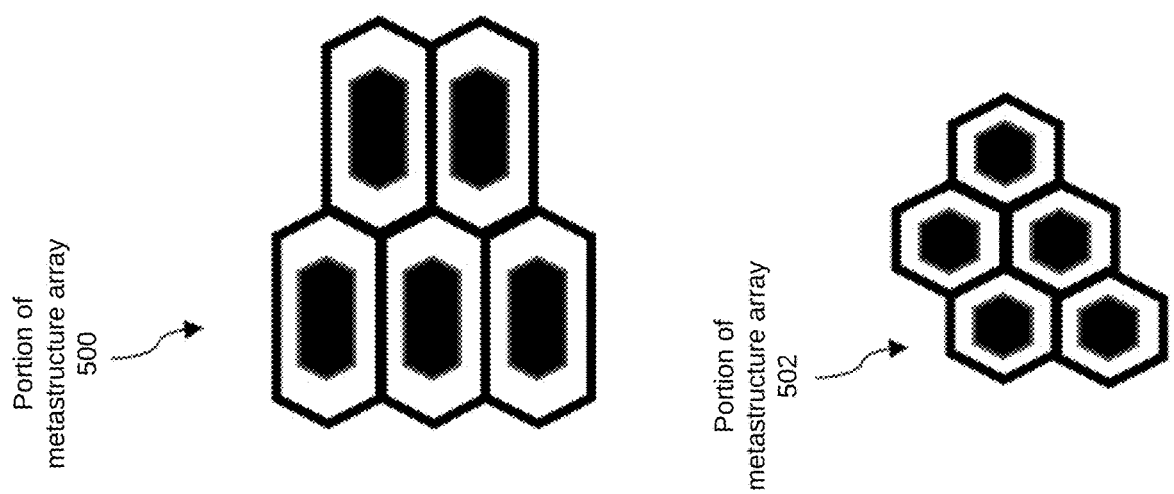

FIGS. 4-5 illustrate example configurations for radiating elements that may be used in the metastructure antenna 304. In FIG. 4, the radiating elements are organized into rows, wherein the specific configuration may be designed to achieve application considerations. Cell 402 in FIG. 4 may be an MTM cell, a patch cell with a surrounding loop, or another such structure that when in an array of cells constitutes a metastructure array as in metastructure array 406. The array of cells 402 may be an array having rows of cells of different sizes, as in arrays 404-406.

In another example, each cell may have an hexagonal shape as in cell 408 to provide design flexibility for a densely packed array. Each cell 408 has an outer geometric shape, referred to herein as a hexagonal conductive loop, e.g., loop 410, and an inner geometric shape that is referred to as a hexagonal conductive patch, e.g., patch 412. The hexagonal shape provides the flexibility of design for a densely packed array, e.g., arrays 414-416, and the parametric shape enables computational design that can be easily scaled and modified while maintaining the basic shape of the hexagon. In this example, the dimensions of the shapes are geometrically similar and their relationship is proportionally maintained.

As illustrated, the sides of the hexagonal loop 410 are designated by reference letter "a" and the sides of the hexagonal patch 412 are designated by reference letter "b". The hexagonal patch 412 is centered within the hexagonal loop 410. Corresponding points on the perimeters of the loop and patch are equidistant from each other, specifically in this example, at a distance designated by "d". This configuration is repeated to form a densely packed lattice. FIG. 5 illustrates examples of scaling of various hexagonal radiating elements, and their positioning within lattices 500-508. There is a large variety of hexagonal shapes and configurations that may be implemented, both symmetric and asymmetric. Note also that although illustrated as having a hexagonal shape, a radiating element may be of another shape, e.g., circular, rectangular, etc., depending on the application. A variety of sizes, configurations and designs may be implemented.

Figure 6:
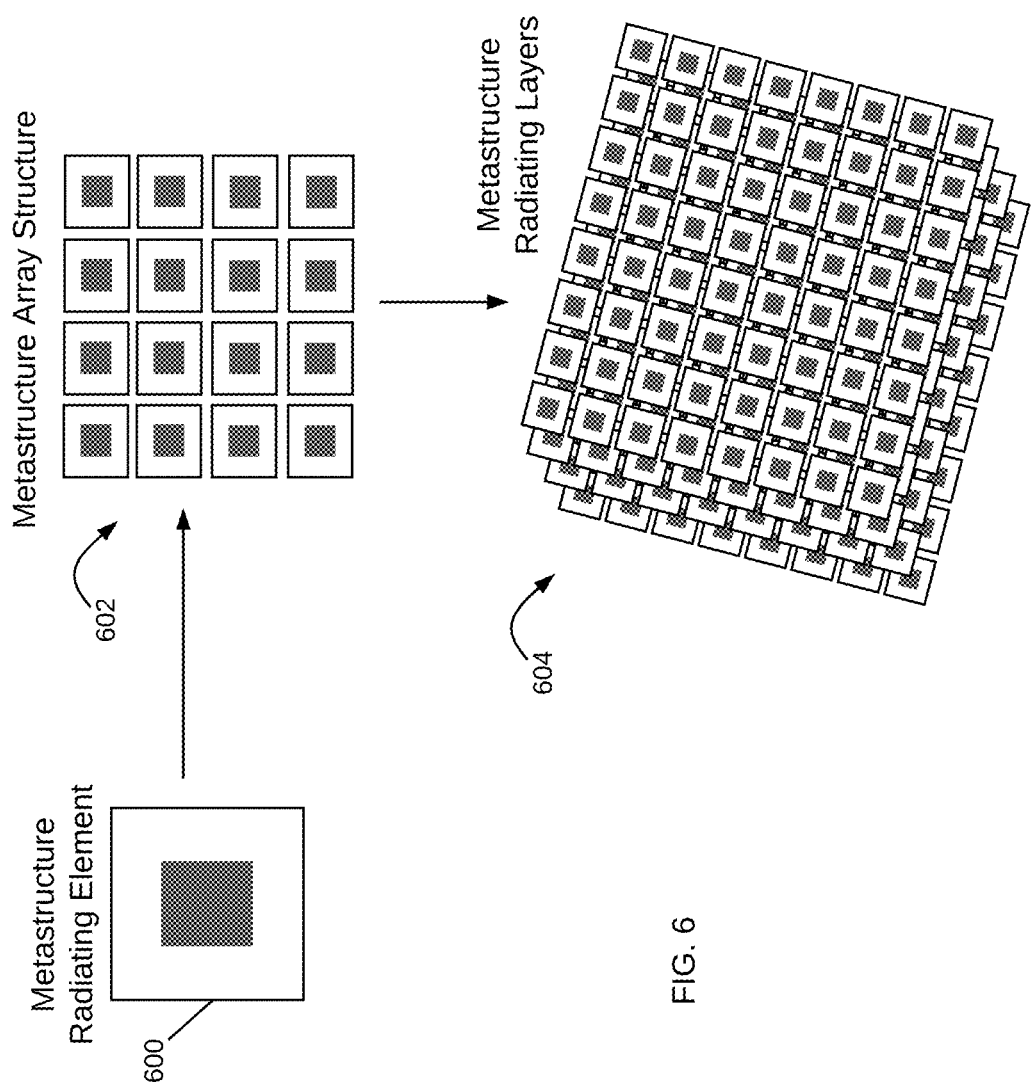
FIG. 6 is a schematic diagram of a metastructure radiating element, a single layer metastructure array and a multi-layer metastructure array in accordance with various examples.

In FIG. 6, a metastructure radiating element 600 is shown to have a rectangular shape. The metastructure radiating element 600 can be arranged in a metastructure array structure 602 as in the metastructure array of cells 306 in FIG. 3. Note that in structure 602, the radiating elements are spaced apart by a distance that is determined based on the desired radiation pattern and beam characteristics. Note also that a radiating array structure may be implemented as a layer in a multi-layer radiating array, such as metastructure radiating layers 604 having 4 layers of 8×8 radiating arrays. The number of elements in an array, the shape of the elements, the spacing between the elements, and the number of layers can all be designed to achieve a desired performance, with subarrays configured to generate beams at a given direction and phase.

In some examples, each portion of the cells, or subarray of cells, are configured to operate together and thus to direct communications to a given user or in a specific direction. This may be used in environment 100 to direct a communication stream to a given user, e.g., UE 116 in dead zone area 122, and maximize available transmission energy to that user, and thus increase the throughput to that user. This is a consideration in many applications, such as in video streaming to a mobile device. In a congested environment, it helps the transmission to each user, and allows the system to adjust the energy used for each transmission. For example, in environment 100 of FIG. 1, a user may be in a video chat, a second user on an audio call, and a third user may be streaming a sports game. MRM 120 is able to determine the bandwidth and throughput requirements of each of the users. This information is then used to adjust the transmission directly to each user and balance the available transmission energy accordingly.

Figure 7:
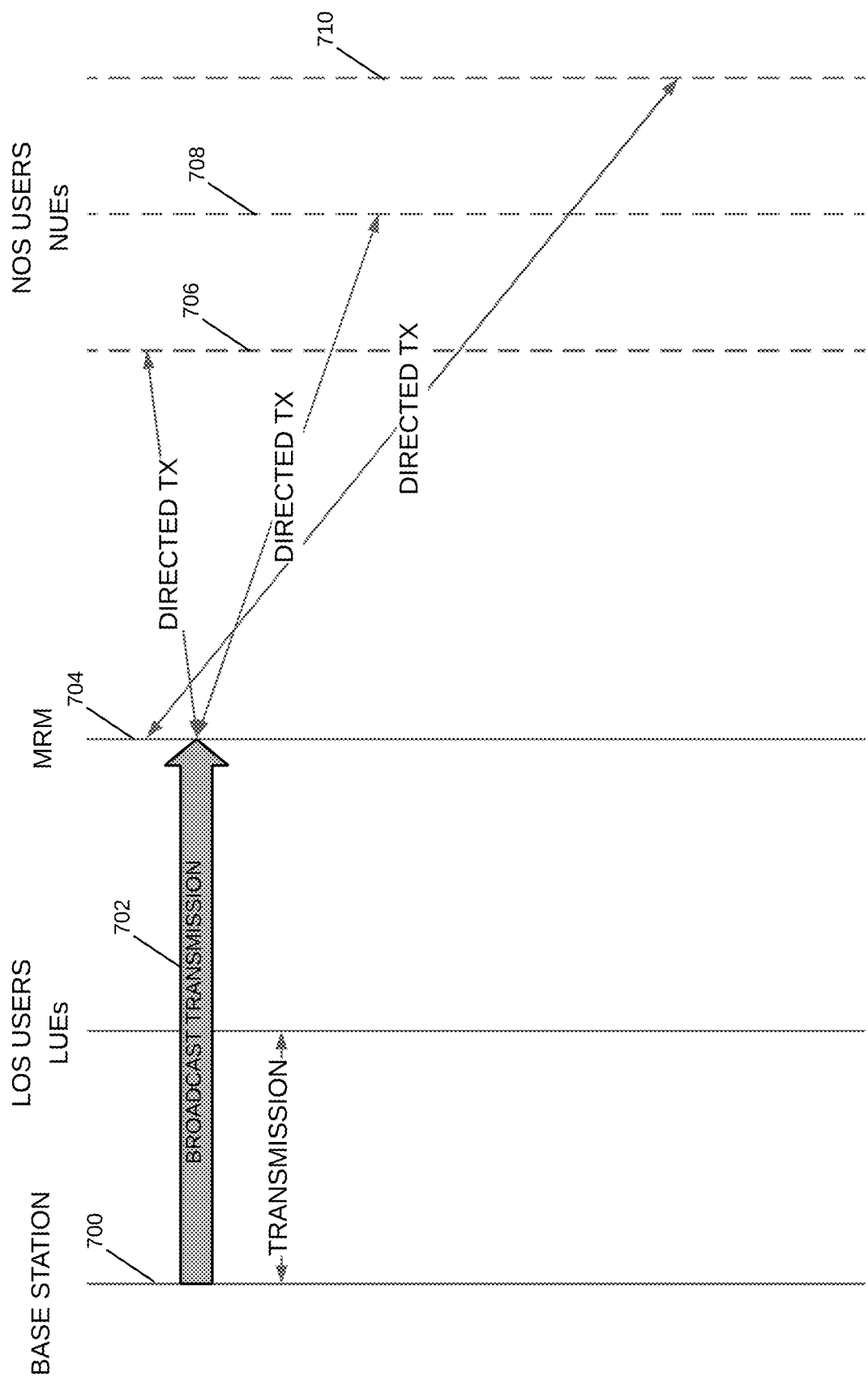
FIG. 7 is a signal flow diagram of operation of an MRM in communication with both Line-of-Sight ("LOS") and Non-Line-of-Sight ("NLOS") users in accordance with various examples.

Using a structure such as in FIG. 3 and with cells as in FIGS. 4-6, the MRM 104 is capable of a variety of operations. One operational scenario is illustrated by the signal flow diagram of FIG. 7, where a base station desires to communicate with multiple UEs where some are located in dead zones. As illustrated, the BS 700 broadcasts a signal 702 that may be received by multiple users. This broadcast signal is received by the MRM 704, which identifies multiple UEs 706-710 in NLOS areas, referred to herein as "NUEs", that are not reached by the BS 700. The MRM 704 transmissions are then directed to individual NUEs. The NUEs are located in the dead zones covered by MRM 704, e.g., dead zone 122. The communications between the BS 700 and the NUEs 706-710 is facilitated by MRM 704. Communications with UEs in LOS areas, referred to herein as "LUEs", are done directly between the LUEs and BS 102.

Figure 8:
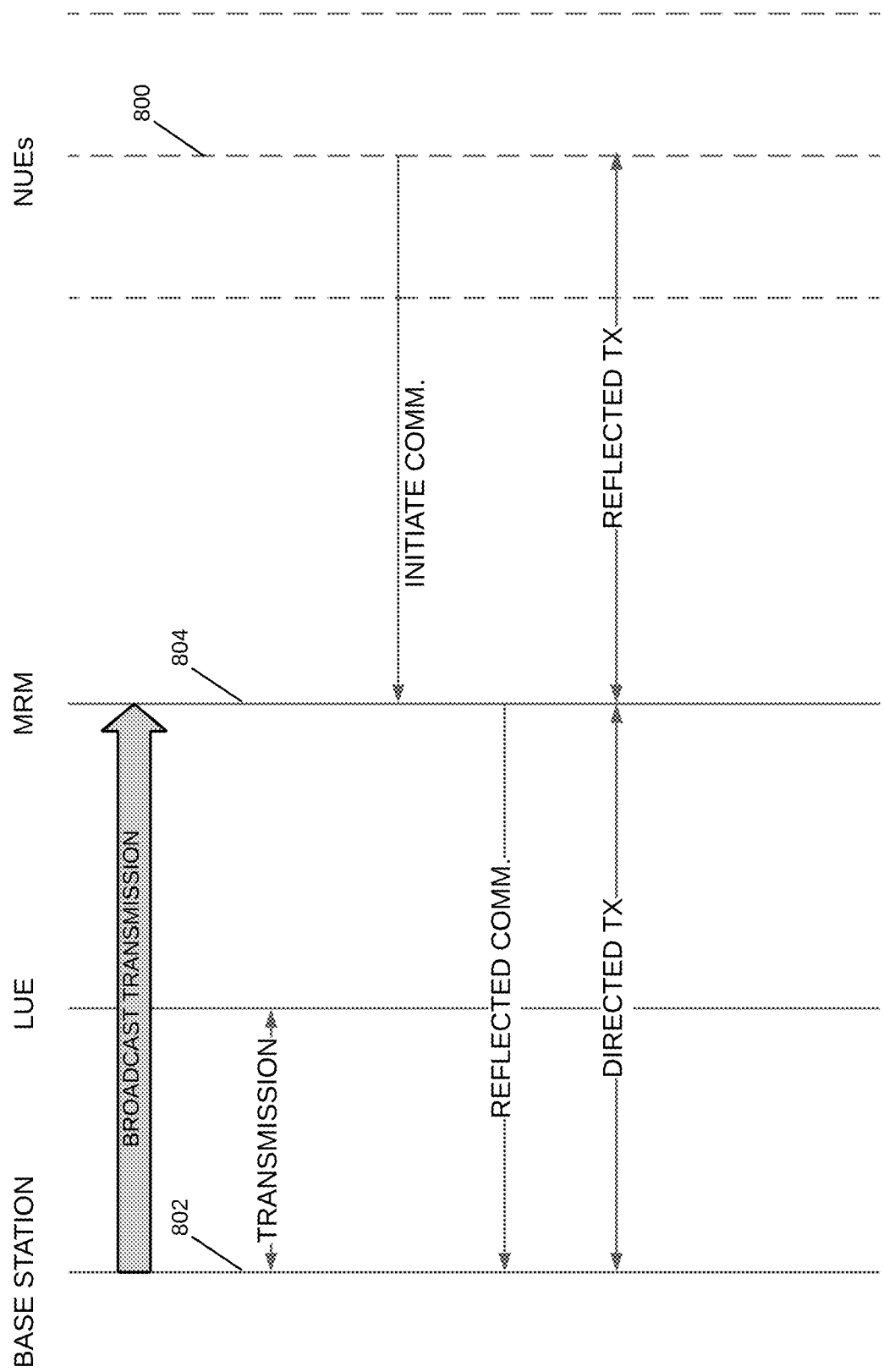
FIG. 8 is a signal flow diagram of operation of an MRM for a NLOS user-initiated communication, in accordance with various examples.

FIG. 8 illustrates another operational scenario, where a NUE 800 sends a request to initiate communication with the BS 802. This signal is intercepted by the MRM 804, which identifies the NUE 800 as located in a dead zone. The MRM 804 facilitates this communication by sending a reflected communication to the BS 802. Note that to enhance the coverage area of BS 802, the MRM 804 need not fully process the information from the BS 802, but rather uses information provided as a control signal on a control channel to identify NUEs and direct communications thereto. The MRM 804 receives the control signal and processes this information internally. Once the MRM 804 determines that there are NUEs within its range, the MRM 804 begins the directed transmissions. This is illustrated in FIG. 9, where the MRM 900 receives the broadcast transmission and the control signal, typically together, and processes the control signal internally. Once the MRM 900 determines that a particular UE is a NUE, e.g., NUE 902, a directed communication is initiated. In this way, the MRM 900 is able to extend the reach of transmission hubs, such as base stations. The MRM 900 is an active device that receives control information from BSs, and reflects transmissions to NUEs in response to that control information. The transmissions are reflected by controlling the reactance of individual cells in its metastructure, which may include controlling individual subarrays of cells.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A metastructure reflector in a wireless communication system, comprising:
    a transceiver unit configured to receive a plurality of transmissions from a base station;
    a radiating structure comprising a plurality of subarrays of radiating cells configured to radiate the plurality of transmissions to a plurality of user equipments (UEs) that are respectively located in a non-line-of-sight area with respect to the base station, wherein at least one cell of the plurality of subarrays of radiating cells is coupled to a varactor, the varactor disposed between a conductive area of the at least one cell and a conductive outer loop of the at least one cell, the conductive outer loop laterally surrounding the conductive area with a space between the conductive area and the conductive outer loop, the varactor configured to alter a reactance of the at least one cell to provide a beamform having a beam width and a direction as determined by the varactor of the at least one cell; and
    a subarray controller configured to control the plurality of subarrays of the radiating structure and to radiate the plurality of transmissions in multiple directions as multiple directional beamforms, each directional beamform of the multiple directional beamforms having a respective beam width, using respective subarrays of the plurality of subarrays operating at different frequencies, each subarray of the plurality of subarrays configured to radiate the transmissions at a given direction provided by the transceiver unit and in response to an identification of a position of at least one UE of the plurality of UEs with respect to the base station.

2. The metastructure reflector of claim 1, wherein the radiating structure comprises a metastructure.

3. The metastructure reflector of claim 1, wherein at least one radiating cell of the plurality of subarrays of the radiating cells comprises a metamaterial cell.

4. The metastructure reflector of claim 1, wherein the transceiver unit adjusts at least one subarray of the plurality of subarrays based on a control signal received from the base station on a control channel.

5. The metastructure reflector of claim 1, further comprising an antenna feed configured to distribute the plurality of transmissions to the radiating structure in a plurality of transmission lines.

6. The metastructure reflector of claim 1, wherein each radiating cell of the plurality of subarrays of radiating cells is coupled to a varactor.

7. The metastructure reflector of claim 1, wherein each radiating cell of the plurality of subarrays of radiating cells is configured on a dielectric layer.

8. The metastructure reflector of claim 1, wherein the plurality of subarrays are arranged in layers.

9. A metastructure antenna for use in a reflector in a wireless communications system, comprising:
    a first set of metastructure cells configured to reflect a first set of transmissions from a base station to a first direction as a first set of directional beamforms operating at a first frequency;
    a second set of metastructure cells configured to reflect a second set of transmissions from the base station to a second direction as a second set of directional beamforms operating at a second frequency different from the first frequency,
    wherein at least one metastructure cell from the first and second sets of metastructure cells is coupled to a varactor, the varactor disposed laterally between a conductive area of the at least one metastructure cell and a conductive outer loop of the at least one metastructure cell with a space between the conductive area and the conductive outer loop, the varactor configured to alter a reactance of the at least one metastructure cell to provide a beamform having a beam width and a direction as determined by the varactor of the at least one metastructure cell; and
    a set of reactance control devices, wherein each of the set of reactance control devices is configured to alter a reactance of at least one metastructure cell from the first and second sets of metastructure cells in response to identification of a position of at least one user equipment with respect to the base station.

10. The metastructure antenna of claim 9, wherein the first set and second set of metastructure cells comprise metamaterial cells.

11. The metastructure antenna of claim 9, wherein the varactor is a first varactor, and at least one of the set of reactance control devices comprises a second varactor.

12. The metastructure antenna of claim 9, wherein a set of reactance control devices for the first set of metastructure cells alters the reactance of the first set of metastructure cells to direct a radiation beam in the first direction.

13. The metastructure antenna of claim 9, wherein the set of transmissions is transmitted to the metastructure antenna by an antenna feed having a plurality of transmission lines.

14. The metastructure antenna of claim 9, further comprising a subarray controller configured to control subarrays of metastructure cells.

15. The metastructure antenna of claim 9, wherein each metastructure cell from the first and second sets of metastructure cells has a corresponding reactance control device and the reactance of each metastructure cell from the first and second sets of metastructure cells is adjusted individually.

16. A method to enhance wireless coverage to non-line-of-sight users, comprising:
  intercepting a transmission and a control signal from a base station;
  identifying a first user in a first non-line-of-sight area from the base station and a second user in a second non-line-of-sight area from the base station based on the control signal; and
  controlling a first subarray of metastructure cells to reflect the transmission to the first user as a first directional beamform operating at a first frequency and a second subarray of metastructure cells to reflect the transmission to the second user as a second directional beamform operating at a second frequency different from the first frequency, in response to identifying a position of the first user and the second user with respect to the base station,
  wherein at least one metastructure cell from the first and second subarray of metastructure cells is coupled to a varactor disposed between a conductive area of the at least one metastructure cell and a conductive outer loop that laterally surrounds the conductive area with a space between the conductive area and the conductive outer loop, the varactor configured to alter a reactance of the at least one metastructure cell to provide a beamform having a beam width and a direction as determined by the varactor of the at least one metastructure cell.

17. The method of claim 16, further comprising controlling a second subarray of metastructure cells to direct the transmission to a second user.

18. The method of claim 16, wherein controlling a first subarray of metastructure cells comprises controlling a reactance of each metastructure cell in the first subarray.

19. The method of claim 16, wherein each of the first subarray of metastructure cells and the second subarray of metastructure cells comprise metamaterial cells, and wherein the first subarray of metastructure cells and the second subarray of metastructure cells are included in a multi-layer metastructure antenna.

20. The method of claim 16, wherein the metastructure cells are hexagonal cells organized in a lattice.

* * * * *